Dec. 16, 1969  T. B. SAUNDERS  3,483,787
REINFORCED PLASTIC FASTENER
Filed July 25, 1968
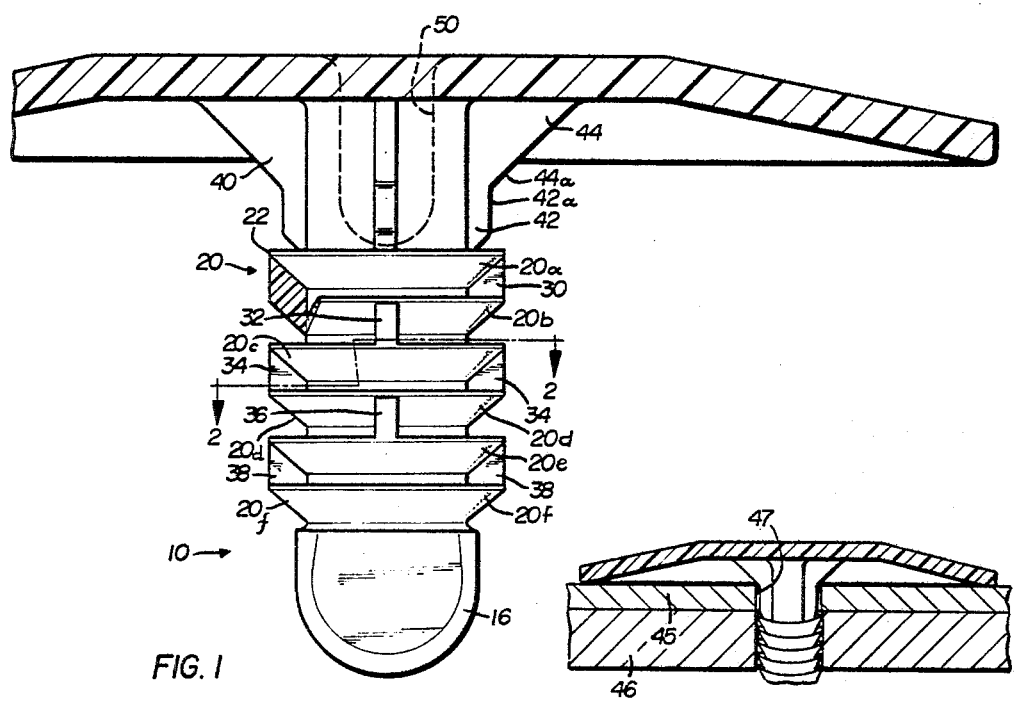
FIG. 1
FIG. 2
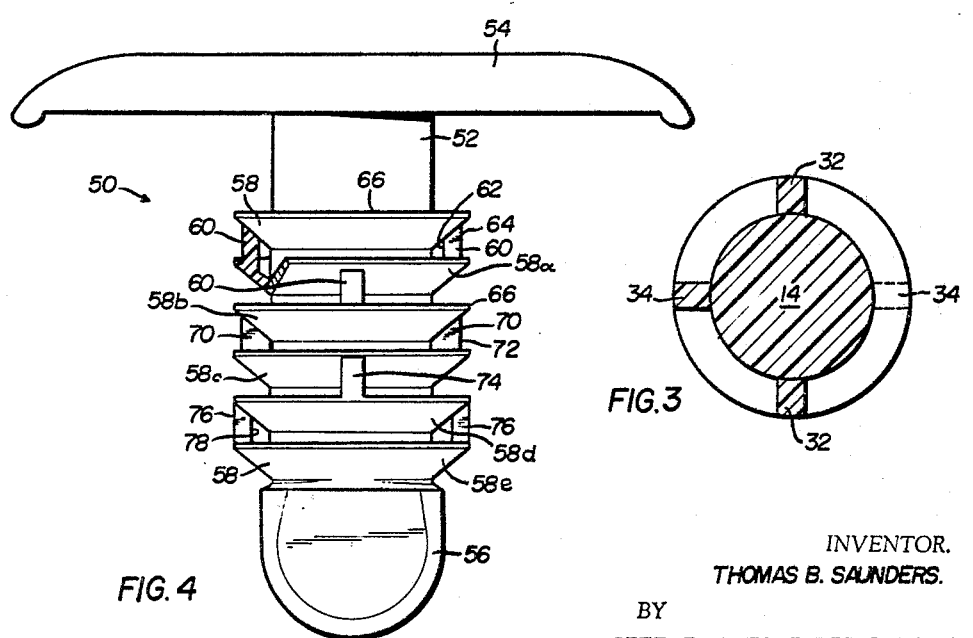
FIG. 4
FIG. 3
INVENTOR.
THOMAS B. SAUNDERS.
BY
SETTLE, BATCHELDER & OLTMAN.
ATT'YS.

United States Patent Office 3,483,787
Patented Dec. 16, 1969

3,483,787
REINFORCED PLASTIC FASTENER
Thomas B. Saunders, St. Clair Shores, Mich., assignor to Robin Products Company, Warren, Mich., a corporation of Michigan
Filed July 25, 1968, Ser. No. 747,544
Int. Cl. F16b *19/00;* A44b *21/00*
U.S. Cl. 85—5                                                7 Claims

ABSTRACT OF THE DISCLOSURE

A resilient fastening member having a plurality of spaced, dished ribs or louvers extending outwardly from the main shank of the fastener wtih reinforcing means interconnecting adjacent dished louvers at radially spaced points.

Background of the invention

The present invention relates generally to fastening devices and more particularly to an improved louvered fastener normally received in a blind opening in a support.

One type of prior art fastener which has found extensive use for interconnecting two members or for connecting a single member to a support is commonly referred to as the "plastic nail." This type of fastener includes a shank portion having an enlarged head at one end with a plurality of spaced ribs or louvers formed integral with the peripheral surface of the shank and the ribs or louvers are axially spaced to provide a slight spacing between the outer edges of the adjacent ribs. Conventionally, these ribs are dish shaped members which extend outwardly and upwardly and terminate at an outer edge having a circumference which is slightly larger than the circumference of the shank and larger than the size of the opening which receives the shank of the fastener.

In assembling this type of fastener, it is only necessary to axially force the shank of the fastener into an opening which is slightly smaller than the peripheral size of the louvers and slightly larger than the size of the shank. Thus, the spaced louvers are partially collapsed and the inherent tendency of the material to expand to its undeformed condition will provide a sufficient frictional force between the outer edges of the louvers and the wall of the opening in the support. Of course, at least one adjacent louver or rib which passes through the panel will engage the outer surface of the support providing additional holding power when the fastener is inserted in an opening extending through the support.

While this type of fastener has found tremendous commercial success, some serious drawbacks have been encountered in producing an inexpensive fastener of this type. Conventionally the present fastener, in many instances are produced by using a nylon product. One class of nylon used for producing fasteners of this type is a nylon sold under the trademark of Zytel and owned by E. I. du Pont de Nemours & Co., Inc.

In an effort to reduce the cost of the "plastic nail" fasteners, applicant has experimented with various plastic materials which are less expensive than the above mentioned product. However, it has been found that ribs formed of less expensive materials, such as polypropylene, which may be purchased at approximately one-third the cost of Zytel brand nylon, are extremely resilient and do not produce the necessary holding action.

Thus, the need still exists for a fastener which can employ a relatively inexpensive plastic material and still maintain the desired retention capability of more expensive plastics.

Summary of the invention

The present invention provides an improved inexpensive plastic nail-type fastener including a shank having axially spaced louvers or ribs with adjacent louvers of the fastener being interconnected at radially-spaced points providing spaced reinforcing means to thereby prevent excess deformation and fracturing or cracking of the louvers during insertion into an opening.

Thus, the primary object of the present invention is to provide a louvered fastener having reinforcing means interconnecting adjacent louvers of the fastener and reinforcing ribs on the head portion thereof.

Another object is to provide a reinforced plastic nail which has increased holding power while utilizing a readily deformable plastic material.

Other objects of this invention will appear in the following description and appended claims, reference being had to the accompanying drawings forming a part of this specification wherein like reference characters designate corresponding parts in the several views.

Brief description of the drawings

FIGURE 1 shows an enlarged side elevation partly in section of the fastening device constructed in accordance with the present invention;

FIGURE 2 is a horizontal sectional view taken generally along lines 2—2 of FIGURE 1;

FIGURE 3 is a fragmentary view of the fastener in the installed condition; and

FIGURE 4 is a fragmentary view similar to FIGURE 1 showing a slightly modified embodiment of the present invention.

Detailed description

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURE 1 of the drawings shows a fastener generally designated at 10 having an enlarged head 12 and a shank portion 14 depending from one surface of the head and terminating at the free end thereof in a reduced portion 16 which is utilized in proper alignment of the fastener with an opening in a support structure.

The fastener further includes a plurality of axially spaced louvers or ribs 20 which are generally inclined upwardly and outwardly and terminate at the upper outer end in vertical edges 22 which have a diameter and circumference slightly larger than that of the shank 14. The louvers or ribs 20 are generally dish shaped and incline upwardly and outwardly towards the head end 12 of the fastener 10 with the inner ends thereof being integral with the peripheral surface of the shank 14.

Generally, although not necessarily, the fastener is received in a blind opening in a support structure with the opening having a diameter slightly larger than the diameter of the shank and slightly smaller than the diameter of the peripheral edge 22 of the respective louvers.

As was indicated above, in conventional fastening members of this type it has been found that the louvers will crack or split at various points during the insertion into the opening. This splitting or cracking of the louvers is of course highly objectionable since it reduces the holding power of the conventional plastic nail and also renders it incapable of being reused after it has been removed from the opening.

According to the present invention, the objections are alleviated by providing reinforcing means between adjacent surfaces of the respective adjacent axially spaced louvers. Thus, as shown in FIGURE 1, the upper louvers 20a and 20b are interconnected by integral ribs or webs 30 which are radially spaced on the peripheral surface of the shank. In the illustrated embodiment shown in FIGURES 1 and 2, the webs or flanges 30 are diametrically spaced and are integral with the adjacent surfaces of the respective ribs 20a and 20b.

Also, the adjacent surfaces of the next pair of axially spaced ribs 20b and 20c are likewise interconnected by reinforcing members or flanges 32. However, it will be noted that the flanges 32 are radially staggered with respect to the flanges 30 and are again diametrically opposed with respect to the shank 14 of the fastener 10. Of course, the next adjacent pair of ribs or louvers 20c and 20b are again interconnected by the flanges 34 while the louvers 20d and 20e are interconnected by webs or flanges 36 and the louvers 20e and 20f are interconnected by ribs 38.

As was indicated hereinabove, when the fastener is actually installed for securing one member to another, it is necessary that the whole size of the opening receiving the fastener be slightly larger than the diameter of the shank 14 and slightly smaller than the diameter of the louvers or ribs 20. This results in having considerable spacing between the peripheral surface of the shank and the inner wall of the opening which receives the fastener. Of course such variations in dimensions are undesirable particularly when a separate panel or element is being attached to the support structure because it will allow relative movement of the panel with respect to the support. Also, in such an environment, the shank is completely unsupported between the head and the first louver or ribs.

Thus, according to a further aspect of the invention, means are provided for accommodating the varying dimensions between the shank diameter and the diameter of the opening receiving the shank of the fastener. As shown in FIGURE 1, this means includes a plurality of reinforcing ribs 40 which are radially spaced on the peripheral surface of the shank 14 and are integral with the shank peripheral surfaces as well as the body of the head 12. In the illustrated embodiment, the ribs 40 each have a lower portion 42 which has a surface 42a spaced from the surface of the shank and substantially parallel to the axis of the shank. Each rib also has an upper portion 44 having an outer surface 44a outwardly and upwardly inclined with respect to the axis of the shank. The lower end of the surface 44a merges with the surface 42a at a point which is spaced axially from the outer upper edge of the uppermost louver or rib 20 a distance substantially equal to or slightly less than the thickness of the panel or element which is to be connected to a support, as will become apparent hereinafter. The upper end of the shank and the head may have a recess 50 which greatly simplifies the molding of the fastener without distortion of the head.

Thus, when the fastener 10 is utilized for connecting a panel 45 to a member 46, as shown in FIGURE 3, the lower portions 42 of the ribs 40 will define an effective diameter on the shank substantially equal to the opening 47 in the panel or element 45, while the upper portions define an increasing effective diameter between the first portions and the head.

Of course, this feature is of extreme importance when it is necessary to install an element or panel such as the panel 45 or a member 46 without allowing any relative movement between the two elements. Also, the reinforcing ribs 40 will of course greatly strengthen the interconnection between the shank and the head.

Furthermore, the outwardly and upwardly inclined surfaces 44a will accommodate different sizes of openings in the panel 45 and still insure a tight snug fit. If, for example, the opening in the panel 45 is larger than the opening in the support member 46, a continuous force will cause the sharp upper edge of the wall surrounding the opening 47 to bite into the ribs and thereby allow or insure a snug fit. This will also insure a centering of the panel opening 47 with the support member opening.

Of course, the edge or surfaces 42a and 44a may take any shape or form other than the flat or inclined shape disclosed, such as an arcuate surface having the upper end merge smoothly with the lower surface of the head. This, of course, would allow varying the size of the opening 47 significantly with respect to the opening in the member 46 and/or the shank diameter.

The interconnecting ribs 40 not only provide a reinforcing between the shank 14 and the head 12 but more importantly provide an opposing force which tends to move the fastener upwardly or out of the opening in the member 46 as well as the opening in the element 45. This upwardly opposing force will tend to straighten the louvers within the opening in the member 46 thereby greatly increasing the holding power of the fastener.

As can readily be appreciated the combined features of the ribs 40 and the reinforcing means 30 through 38 on the louvers 20 will greatly enhance the holding power of the particularly disclosed fastener while allowing the manufacturer to utilize a less expensive material thereby greatly reducing the cost of the entire fastener element.

It can be readily appreciated that the reinforcing means are properly located so as to allow for sufficient flexibility of the respective louvers 20 allowing the louvers to be partially collapsed during the insertion in the opening while at the same time preventing the objectionable splitting or cracking of the louvers during insertion into an opening in a support structure. Once the fastener is inserted the ribs 40 will produce an upwardly directed force tending to withdraw the fastener thereby increasing the holding power.

A slightly modified embodiment of the present invention is disclosed in FIGURE 3 wherein the fastener 50 again has a shank 52 and an enlarged head 54 at one end of the shank and a reduced portion 56 at the opposite end. The dish shaped members are louvers 58 are again axially spaced as is conventional in plastic nails and are integral with the peripheral surface of the shank.

In the modified embodiment of the present invention the upper adjacent ribs 58 and 58a are again interconnected by radially spaced and diametrically opposed members 60 interconnecting adjacent surfaces of spaced pairs of ribs. Also, the second pair of webs or flanges 60a interconnecting louvers 58a and 58b are diametrically opposed and are staggered with respect to the peripheral surface of the shank with the exemplary embodiment showing a staggering of 90 degrees of the second pair of webs with respect to the first pair. However, in the modified embodiment the interconnecting means or webs 60 and 60a terminate at an inner vertical edge 62 which is spaced outwardly from the peripheral surface of the shank 52 while the outer vertical edges 64 terminate inwardly of the outer edges 66 of the respective louvers 58.

The next diametrically opposed pair of flanges or interconnecting members 70 are integral with the adjacent surfaces of louvers 58b and 58c. However the inner edges of the flanges 70 are integral with the outer peripheral surface of the shank 52 while the outer vertical edges terminate along a vertical edge spaced inwardly from the outer edges of the spaced louvers 58b and 58c.

The flanges or members 74 and 76 interconnecting the respective louvers 58c, 58d and 58e having the outer edges coincident with the edges 66 of the louvers while the inner edges are spaced from the peripheral surface of the shank 52.

Of course it is readily apparent that the radial spacing of the louvers 60, 70–76, as well as the louvers 30 through 38, of the respective embodiments may be modified to suit the requirements of a particular fastener. Thus, by way of example, the radial spacing could for example be 120 degrees around the peripheral surface of the shank with three webs interconnecting each adjacent pairs of louvers and the successive group of webs or interconnecting members could be staggered 60 degrees with respect to the previous pair, etc.

Likewise, the particular size of each of the webs 30 through 38, 60, 70 through 76 could likewise be modified to suit the desires or needs of a particular fastener. Thus, for example, while the embodiment shown in FIGURE 1 discloses the webs as being integral with the peripheral surface of the shank 14 and extending outwardly to the outer edge of the louvers 20, it is readily apparent that the webs could terminate at any point spaced inwardly of the outer edges 22 of the respective louvers 20. In fact, it is within the spirit of the present invention to have some of the webs extend out to the outer edge of the adjacent pairs of louvers and have successive webs terminating inwardly of the outer edge at various points such as shown in FIGURE 3. In fact, all of the webs or flanges of a particular fastener could have a configuration such as that shown by webs 30, 60, 70, 72 or 74.

It can readily be appreciated that the improved fastener greatly enhances the holding ability when inserted in an opening and at the same time may be manufactured at substantially less costs than present day plastic fasteners. Thus, it is only necessary, to slightly modify the mold for producing such fasteners to provide the appropriate webs or flanges at strategic locations.

While two exemplary embodiments of the invention have been described in detail, it will be apparent to those skilled in the art that the disclosed embodiments may be modified. Therefore, the foregoing description is to be considered exemplary rather than limiting.

I claim:

1. A one-piece plastic fastener comprising an enlarged head, a substantially rigid integral shank extending from said head and adapted to be received in an opening in a support structure with the opening having a diameter which is greater than the diameter of said shank, and at least two axially spaced circumferential flexible louvers integral with said shank and each having inner and outer surfaces which incline outwardly from said shank and upwardly toward said head, said surfaces terminating at a free end to define a louver diameter greater than the diameter of said opening, and at least one longitudinal web interconnecting the inner and outer surface of an adjacent pair of louvers and defining reinforcing means for said louvers.

2. A one-piece fastener as defined in claim 1 in which said reinforcing means comprise at least two radially spaced webs interconnecting each adjacent pair of louvers.

3. A one-piece fastener as defined in claim 1 in which said reinforcing means comprise diametrically opposed webs interconnecting each adjacent pair of louvers.

4. A one-piece fastener as defined in claim 3 including the further improvement of the diametrically opposed webs of succeeding pairs of adjacent louvers being radially staggered with respect to said shank.

5. A one-piece plastic fastener comprising an enlarged head, a substantially rigid integral shank extending from said head and adapted to be received in an opening in a support structure with the opening having a diameter which is greater than the diameter of said shank, and at least two axially spaced circumferential flexible louvers integral with said shank and each having inner and outer surfaces which incline outwardly from said shank and upwardly toward said head, said surfaces terminating at a free end to define a louver diameter greater than the diameter of said opening, at least one longitudinal web interconnecting the inner and outer surface of an adjacent pair of louvers and defining reinforcing means for said louvers, and means integral with said shank intermediate said head and the adjacent louver for increasing the diameter of said shank to substantially the diameter of said opening.

6. A one-piece fastener as defined in claim 5, in which said means comprises ribs extending radially from said shank and each having a portion thereof integral with said head.

7. A one-piece fastener as defined in claim 5, the further improvement of said portions having outwardly and upwardly tapered surfaces adapted to engage a panel edge adjacent the opening producing an upwardly directed force tending to move said fastener out of the opening whereby to increase the holding power of said webs.

References Cited

UNITED STATES PATENTS

| 3,199,187 | 8/1965 | Lyday et al. | 85—5 X |
| 3,218,680 | 11/1965 | Deal et al. | 85—5 X |
| 3,236,145 | 2/1966 | Schenkel | 85—83 |
| 3,252,677 | 5/1966 | Raymond | 85—5 X |

FOREIGN PATENTS 975,957   11/1964   Great Britain.

RAMON S. BRITTS, Primary Examiner

U.S. Cl. X.R.

24—73